United States Patent

Nakagawa

[11] 4,232,940
[45] Nov. 11, 1980

[54] OBJECTIVE LENS SYSTEM FOR MICROSCOPES

[76] Inventor: Jihei Nakagawa, Hagiyama-machi 5-6, Higashimurayama-shi, Tokyo-to, Japan

[21] Appl. No.: 919,834

[22] Filed: Jun. 28, 1978
(Under 37 CFR 1.47)

[30] Foreign Application Priority Data

Jun. 29, 1977 [JP] Japan .................... 52-76533

[51] Int. Cl.² .................. G02B 3/00; G02B 9/62
[52] U.S. Cl. ........................................ 350/175 ML
[58] Field of Search ............ 350/176, 177, 175 ML, 350/216

[56] References Cited

U.S. PATENT DOCUMENTS

| | | | |
|---|---|---|---|
| 3,659,924 | 5/1972 | Shoemaker | 350/175 ML X |
| 3,746,428 | 7/1973 | Shoemaker | 350/175 ML X |
| 3,912,378 | 10/1975 | Gotto | 350/216 |

*Primary Examiner*—Paul A. Sacher
*Attorney, Agent, or Firm*—Brisebois & Kruger

[57] ABSTRACT

An apochromat type high magnification objective lens system for microscopes comprising a first cemented semispherical lens component, a second positive meniscus lens component, a third cemented lens component consisting of three lens elements, a fourth cemented lens component consisting of three lens elements, a fifth cemented meniscus lens component and sixth cemented meniscus lens component. Said lens system is so designed as to assure favorably corrected aberrations by improving the fourth, fifth and sixth lens components so as to have enhanced functions to correct chromatic aberration and other aberrations.

3 Claims, 3 Drawing Figures

4,232,940

OBJECTIVE LENS SYSTEM FOR MICROSCOPES

BACKGROUND OF THE INVENTION (a) Field of the Invention

The present invention relates to a liquid immersion plan apochromat type objective lens system for microscopes which is designed for a magnification of ×100, a numerical aperture (N.A.) of approximately 1.4 and a field number attaining to 30.

(b) Description of the Prior Art

It is one of the difficult problems to design a plan apochromat type high magnification objective lens system for microscopes having a very large N.A. of approximately 1.4. The reason for such difficulty lies in the fact that it is required to favorably correct chromatic and spherical aberrations by adequately distributing powers among lens components and selecting suitable materials therefor, and at the same time, to minimize Petzval's sum. However, there are conflicting tendencies in these corrections. That is to say, an attempt to minimize Petzval's sum will aggravate chromatic aberration, etc., whereas an attempt to correct chromatic and spherical aberrations, in contrast, will increse Petzval's sum, thereby posing the afore-mentioned difficulty. It is a historically known fact that chromatic aberration can be corrected by selecting glass materials having different dispersing powers for positive and negative lens components. In case of an apochromat, chromatic aberration is further corrected by utilizing difference in dispersion by using extraordinarily dispersive glass such as fluorite. On the other hand, it is also known well that Petzval's sum can be minimized by adequately arranging wide airspace, thick lens component and negative lens component in a lens system. In an objective lens system of this type, arrangement of negative lens components are important for correcting aberrations and minimizing Petzval's sum.

SUMMARY OF THE INVENTION

A general object of the present invention is to provide a plan apochromat type high magnification objective lens system for microscopes which has a numerical aperture of approximately 1.4 and wherein various aberrations are favorably corrected.

The objective lens system according to the present invention has such a composition as shown in FIG. 1. That is to say, said lens system comprises a first semispherical cemented lens component having an embedded semispherical lens element (a semispherical lens element comprising another lens element embedded therein), a second positive meniscus lens component having a concave surface on the object side, a third cemented lens component consisting of a positive element, a negative element and a positive element, a fourth cemented lens component consisting of a negative element, a positive element and a negative element, a fifth cemented meniscus lens component having a convex surface on the object side and a sixth cemented meniscus lens component having a convex surface on the object side and arranged with a relatively large airspace from said fifth lens component. The lens system according to the present invention is characterized in that it satisfies the conditions defined below:

$$f_4 < f_5 < f_6 < 0 \tag{1}$$

$$15f > |f_{456}| > 10f, f_{456} < 0 \tag{2}$$

$$6f > d_{16} > 4.5f \tag{3}$$

$$\nu_{12} < 28, \nu_{13} < 60 \tag{4}$$

wherein the reference symbols represent as follows:
 f: total focal length of the lens system as a whole
 $f_4$, $f_5$, $f_6$: focal lengths of said fourth, fifth and sixth lens components respectively
 $f_{456}$: total focal length of said fourth, fifth and sixth lens components considered as an assembly
 $d_{16}$: airspace between said fifth and sixth lens components
 $\nu_{12}$: Abbe's number of the positive element of said sixth lens component.
 $\nu_{13}$: Abbe's number of the negative element of said sixth lens component Owing to such a design as to satisfy the above-mentioned conditions defined as the characteristics of the lens system according to the present invention, said lens system enhances the aberration-correcting function of the negative lens components, thereby making it possible to favorably correct aberrations without using special crystals such as alum.

If the relationship in focal lengths of the fourth, fifth and sixth lens components defined by the condition (1), cannot be satisfied, spherical aberration, coma, etc. will be aggravated and can hardly be corrected.

If the relationship of $|f_{456}| > 10f$ defined by the condition (2) is not satisfied, total focal length of the first through third lens components will be shortened since optical tube length is limited within a certain narrow range by mechanical tube length and these lens components will unavoidably comprise surface having small radius of curvature, thereby aggravating spherical aberration and other aberrations. Total focal length $f_{456}$ deviating the range of $15f > |f_{456}|$ also defined by the condition (2) is undesirable since it will increase Petzval's sum.

When $d_{16}$ is larger than $6f$ in the condition (3), it will be desirable for minimizing Petzval's sum, but undesirable for correcting aberrations since the fourth, fifth and sixth lens components will have strongly negative refractive powers in such a condition. When $d_{16}$ is smaller than $4.5f$, in contrast, it will be difficult to minimize Petzval's sum.

Finally, the condition (4) defining ranges of Abbe's numbers $\nu_{12}$ and $\nu_{13}$ for the positive and negative elements in the sixth lens component is necessary for favorably correcting chromatic aberration. Judging from the composition of the lens system, it will be ineffective to define such a condition for a lens component other than the sixth component, and undesirable especially from the viewpoint to correct lateral chromatic aberration. Though power distribution between the positive and negative elements in the sixth lens component is also related to correction of chromatic aberration in addition to Abbe's numbers $\nu_{12}$ and $\nu_{13}$, the relationship defined by the condition (4) is more fundamental. It will be difficult to favorably correct chromatic aberration so far as the condition (4) is not satisfied.

It is often practiced to use crystals of alum, etc. in addition to those of flurite for designing apochromat type high magnification objective lens systems for microscopes. However, alum has some problems in its stability, etc. and is not preferable for use. The lens system according to the present invention has made it possible, without using alum, to remarkably reduce secondary spectrum by selecting $$KZFS_4 \ (\nu=43.8, \theta_g F=(n_g-n_F)/(n_F-n_c)=0.5623)$$

showing extraordinary dispersion as material for the negative elements of the fourth and fifth lens components and cementing these negative elements made of fluorite.

Further, the lens system according to the present invention comprises the first lens component which consists of a large element and a small one embeded therein so as to impart a large difference in refractive index between these two elements, i.e., to satisfy the relationship of $|n_1-n_3| > 0.3$. This is effective to minimize Petzval's sum and accordingly relieve the fourth, fifth and sixth lens components from the burden to minimize Petzval's sum, thereby making it possible to correct aberrations logically. Furthermore, a characteristic of the lens system according to the present invention lies in the fact that refractive index is enhanced for the element arranged on the object side in the third lens component. That is to say, an additional condition of $n_4 > 1.7$ is effective for favorably correcting spherical aberration.

DESCRIPTION OF THE PREFERRED EMBODIMENTS

Figure 1:
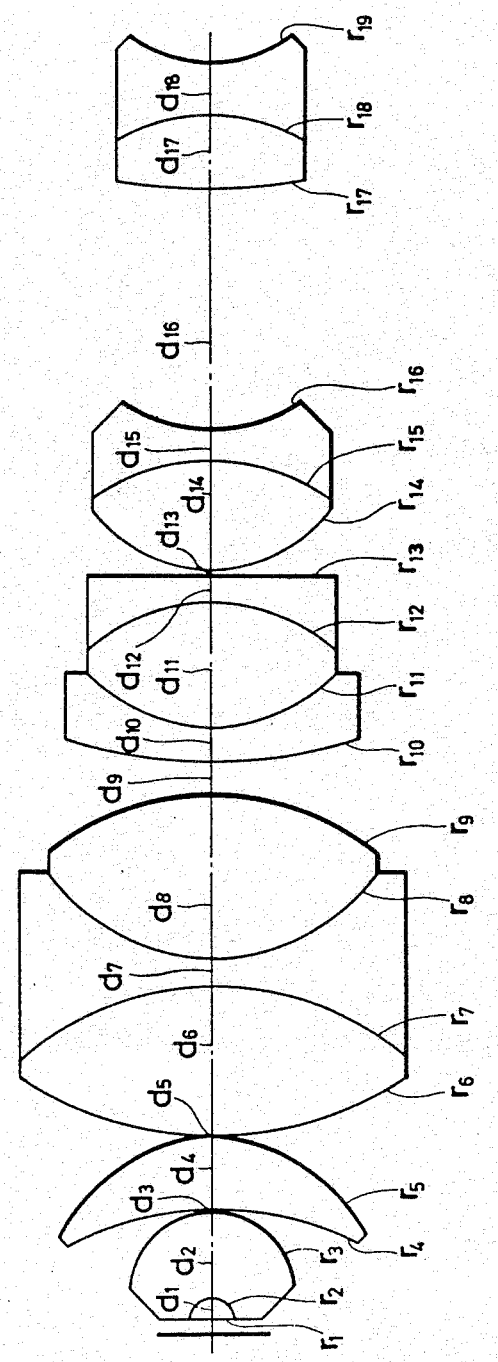
FIG. 1 shows a sectional view illustrating the composition of the objective lens system for microscopes according to the present invention.
Figure 2:
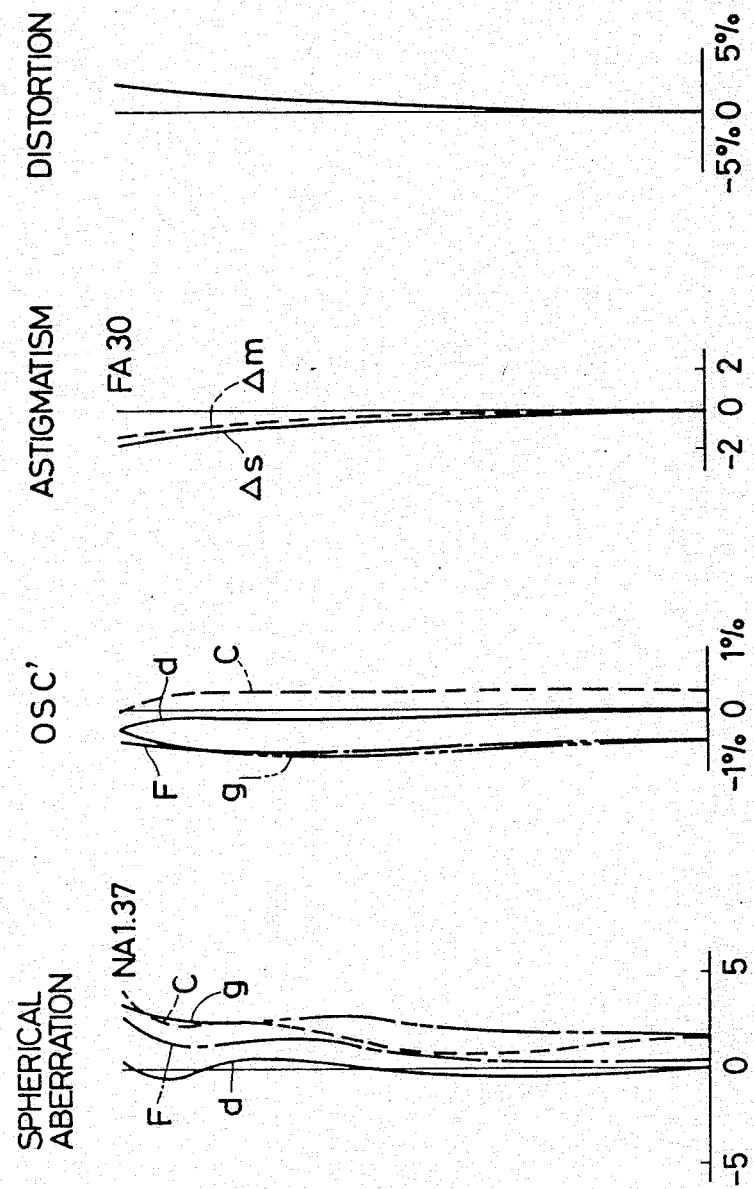
FIG. 2 shows graphs illustrating the aberration characteristics of the Embodiment 1.
Figure 3:
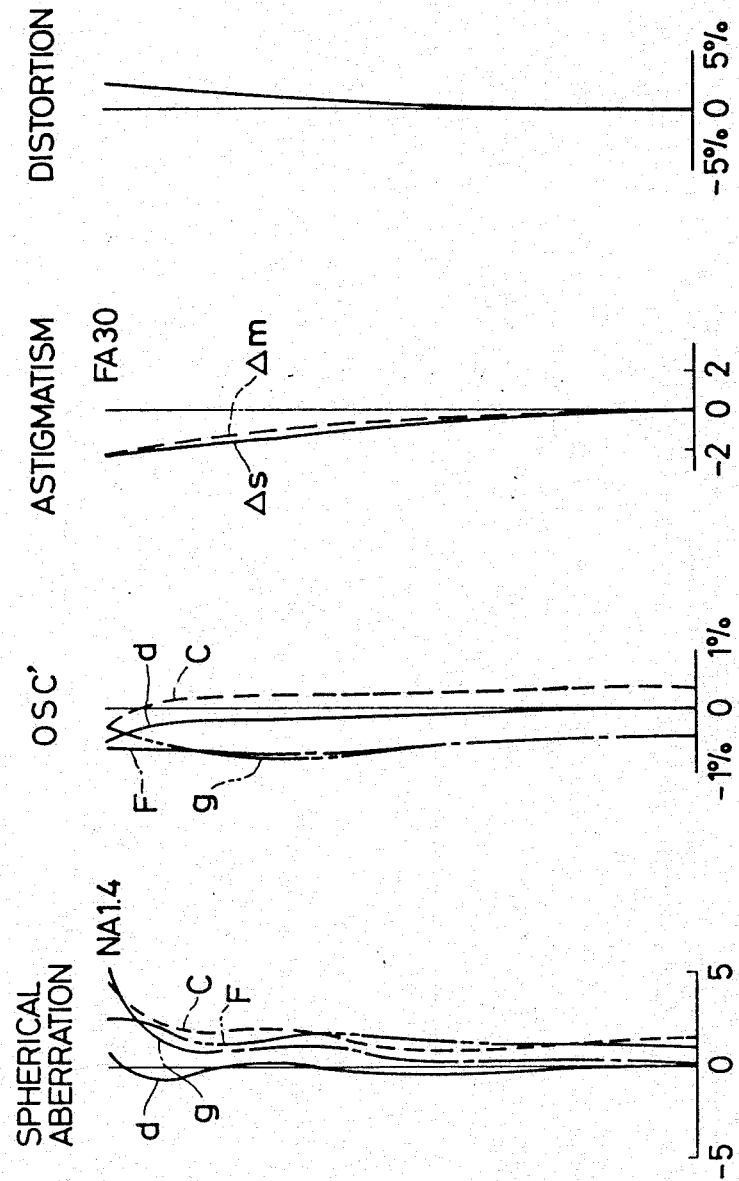
FIG. 3 shows graphs illustrating the aberration characteristics of the Embodiment 2.

Now, some preferred embodiments of the objective lens system for microscopes according to the present invention will be described detailedly.

Embodiment 1

$r_1 = \infty$
$r_2 = -0.4607$
$r_3 = -1.6929$
$r_4 = -7.0921$
$r_5 = -3.5319$
$r_6 = 7.4939$
$r_7 = -6.6972$
$r_8 = 4.3550$
$r_9 = -5.9386$
$r_{10} = 8.5190$
$r_{11} = 3.3477$
$r_{12} = -4.4238$
$r_{13} = -102.7113$
$r_{14} = 3.3200$
$r_{15} = -5.0522$
$r_{16} = 3.6272$
$r_{17} = 20.0448$
$r_{18} = -3.8974$
$r_{19} = 3.1388$ $d_1 = 0.4484$, $n_1 = 1.51742$, $\nu_1 = 52.3$
$d_2 = 1.7568$, $n_2 = 1.883$, $\nu_2 = 40.8$
$d_3 = 0.0123$
$d_4 = 1.5971$, $n_3 = 1.72342$, $\nu_3 = 38.0$
$d_5 = 0.0307$
$d_6 = 3.0160$, $n_4 = 1.755$, $\nu_4 = 52.3$
$d_7 = 0.6143$, $n_5 = 1.74$, $\nu_5 = 31.7$
$d_8 = 3.3170$, $n_6 = 1.43389$, $\nu_6 = 95.2$
$d_9 = 0.5344$
$d_{10} = 0.6143$, $n_7 = 1.6134$, $\nu_7 = 43.8$
$d_{11} = 2.6044$, $n_8 = 1.43389$, $\nu_8 = 95.2$
$d_{12} = 0.6143$, $n_9 = 1.6134$, $\nu_9 = 43.8$
$d_{13} = 0.0614$
$d_{14} = 2.2727$, $n_{10} = 1.43389$, $\nu_{10} = 95.2$
$d_{15} = 0.6143$, $n_{11} = 1.6134$, $\nu_{11} = 43.8$
$d_{16} = 5.3931$
$d_{17} = 1.4803$, $n_{12} = 1.78472$, $\nu_{12} = 25.7$
$d_{18} = 1.0934$, $n_{13} = 1.50378$, $\nu_{13} = 66.8$ $f = 1.0, \beta = 100X, N.A = 1.37$
$\Sigma P = 0.06, f_4 = -79.889, f_5 = -40.057$
$f_6 = -29.682, f_{456} = -12.380$

Embodiment 2

$r_1 = \infty$
$r_2 = -0.4710$
$r_3 = -1.6661$
$r_4 = -6.7476$
$r_5 = -3.4239$
$r_6 = 7.4885$
$r_7 = -6.1582$
$r_8 = 4.3237$
$r_9 = -5.6027$
$r_{10} = 8.2802$
$r_{11} = 3.4432$
$r_{12} = -3.9752$
$r_{13} = -204.4505$
$r_{14} = 3.2778$
$r_{15} = -4.9215$
$r_{16} = 3.5664$
$r_{17} = 17.8007$
$r_{18} = -3.8859$
$r_{19} = 3.1153$ $d_1 = 0.4348$, $n_1 = 1.51742$, $\nu_1 = 52.3$
$d_2 = 1.7271$, $n_2 = 1.883$, $\nu_2 = 40.8$
$d_3 = 0.0121$
$d_4 = 1.5278$, $n_3 = 1.72342$, $\nu_3 = 38.0$
$d_5 = 0.0121$
$d_6 = 2.9650$, $n_4 = 1.755$, $\nu_4 = 52.3$
$d_7 = 0.6039$, $n_5 = 1.74$, $\nu_5 = 31.7$
$d_8 = 3.2609$, $n_6 = 1.43389$, $\nu_6 = 95.2$
$d_9 = 0.4650$
$d_{10} = 0.6039$, $n_7 = 1.6134$, $\nu_7 = 43.8$
$d_{11} = 2.5362$, $n_8 = 1.43389$, $\nu_8 = 95.2$
$d_{12} = 0.6039$, $n_9 = 1.6134$, $\nu_9 = 43.8$
$d_{13} = 0.0242$
$d_{14} = 2.2343$, $n_{10} = 1.43389$, $\nu_{10} = 95.2$
$d_{15} = 0.6039$, $n_{11} = 1.6134$, $\nu_{11} = 43.8$
$d_{16} = 5.0362$
$d_{17} = 1.4553$, $n_{12} = 1.78472$, $\nu_{12} = 25.7$
$d_{18} = 1.0749$, $n_{13} = 1.50378$, $\nu_{13} = 66.8$ $f = 1.0, \beta = 100X, N.A = 1.4$
$\Sigma P = 0.074, f_4 = -63.1679, f_5 = -37.8255$
$f_6 = -34.5278, f_{456} = -11.9595$ wherein the reference symbols $r_1$ through $r_{19}$ represent radii of curvature on the surfaces of the respective lens elements, the reference symbols $d_1$ through $d_{18}$ designate thicknesses of the respective lens elements and air-spaces therebetween, the reference symbols $n_1$ through $n_{13}$ denote refractive indices of the respective lens elements, the reference symbols $\nu_1$ through $\nu_{13}$ represent Abbe's numbers of the respective lens elements and the reference symbol P designates Petzval's sum.

I claim:

1. An objective lens system for microscopes comprising a first semispherical lens component having an embedded semispherical lens element, a second positive meniscus lens component having a concave surface on the object side, a third cemented lens component consisting of a positive element, a negative element and a positive element, a fourth cemented lens component consisting of a negative element, a positive element and a negative element, a fifth cemented meniscus lens component having a convex surface on the object side, and a sixth cemented meniscus lens component having a convex surface on the object side and arranged with a relatively wide airspace from said fifth lens component, and said lens system satisfying the following conditions:

$$-80f < f_4 < f_5 < f_6 < -29 \quad (1)$$

$$13f > |f_{456}| > 11f, \ f_{456} < 0 \quad (2)$$

$$5.5f > d_{16} > 5f \quad (3)$$

$$\nu_{12} = 2.57, \nu_{13} = 66.8 \quad (4)$$

wherein the reference symbols $f_4$, $f_5$ and $f_6$ represent focal lengths of the fourth, fifth and sixth lens components respectively, the reference symbol $f_{456}$ designates total focal length of the fourth, fifth and sixth lens components considered as an assembly, the reference symbol f denotes focal length of said lens system as a whole, the reference symbol $d_{16}$ represents air space formed between the fifth and sixth lens components, and the reference symbols $\nu_{12}$ and $\nu_{13}$ designate Abbe's numbers of the two elements of the sixth lens components.

2. An objective lens system for microscopes according to claim 1 having the following numerical data:

| | | | |
|---|---|---|---|
| $r_1 = \infty$ | | | |
| | $d_1 = 0.4484$ | $n_1 = 1.51742$ | $\nu_1 = 52.3$ |
| $r_2 = -0.4607$ | | | |
| | $d_2 = 1.7568$ | $n_2 = 1.883$ | $\nu_2 = 40.8$ |
| $r_3 = -1.6929$ | | | |
| | $d_3 = 0.0123$ | | |
| $r_4 = -7.0921$ | | | |
| | $d_4 = 1.5971$ | $n_3 = 1.72342$ | $\nu_3 = 38.0$ |
| $r_5 = -3.5319$ | | | |
| | $d_5 = 0.0307$ | | |
| $r_6 = 7.4939$ | | | |
| | $d_6 = 3.0160$ | $n_4 = 1.755$ | $\nu_4 = 52.3$ |
| $r_7 = -6.6972$ | | | |
| | $d_7 = 0.6143$ | $n_5 = 1.74$ | $\nu_5 = 31.7$ |
| $r_8 = 4.3550$ | | | |
| | $d_8 = 3.3170$ | $n_6 = 1.43389$ | $\nu_6 = 95.2$ |
| $r_9 = -5.9386$ | | | |
| | $d_9 = 0.5344$ | | |
| $r_{10} = 8.5190$ | | | |
| | $d_{10} = 0.6143$ | $n_7 = 1.6134$ | $\nu_7 = 43.8$ |
| $r_{11} = 3.3477$ | | | |
| | $d_{11} = 2.6044$ | $n_8 = 1.43389$ | $\nu_8 = 95.2$ |
| $r_{12} = -4.4238$ | | | |
| | $d_{12} = 0.6143$ | $n_9 = 1.6134$ | $\nu_9 = 43.8$ |
| $r_{13} = -102.7113$ | | | |
| | $d_{13} = 0.0614$ | | |
| $r_{14} = 3.3200$ | | | |
| | $d_{14} = 2.2727$ | $n_{10} = 1.43389$ | $\nu_{10} = 95.2$ |
| $r_{15} = -5.0522$ | | | |
| | $d_{15} = 0.6143$ | $n_{11} = 1.6134$ | $\nu_{11} = 43.8$ |
| $r_{16} = 3.6272$ | | | |
| | $d_{16} = 5.3931$ | | |
| $r_{17} = 20.0448$ | | | |
| | $d_{17} = 1.4803$ | $n_{12} = 1.78472$ | $\nu_{12} = 25.7$ |
| $r_{18} = -3.8974$ | | | |
| | $d_{18} = 1.0934$ | $n_{13} = 1.50378$ | $\nu_{13} = 66.8$ |
| $r_{19} = 3.1388$ | | | |

$f = 1.0$, $\beta = 100X$, N.A = 1.37
$\Sigma P = 0.06$, $f_4 = -79.889$, $f_5 = -40.057$
$f_6 = -29.682$, $f_{456} = -12.380$ wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{13}$ denote refractive indices of the respective lens elements, the reference symbols $\nu_1$ through $\nu_{13}$ represent Abbe's numbers of the respective lens elements, the reference symbol f designates focal length of the lens system as a whole, the reference symbol $\beta$ denotes magnification of the lens system as a whole, the reference symbol N.A. represents numerical aperture of the lens system as a whole, the reference symbol $\Sigma P$ designates Petzval's sum, the reference symbols $f_4$, $f_5$ and $f_6$ denote focal lengths of the fourth, fifth and sixth lens components respectively, and the reference symbol $f_{456}$ represents total focal length of the fourth, fifth and sixth lens components considered as an assembly.

3. An objective lens system for microscopes according to claim 1 having the following numerical data:

| | | | |
|---|---|---|---|
| $r_1 = \infty$ | | | |
| | $d_1 = 0.4348$ | $n_1 = 1.51742$ | $\nu_1 = 52.3$ |
| $r_2 = -0.4710$ | | | |
| | $d_2 = 1.7271$ | $n_2 = 1.883$ | $\nu_2 = 40.8$ |
| $r_3 = -1.6661$ | | | |
| | $d_3 = 0.0121$ | | |
| $r_4 = -6.7478$ | | | |
| | $d_4 = 1.5278$ | $n_3 = 1.72342$ | $\nu_3 = 38.0$ |
| $r_5 = -3.4239$ | | | |
| | $d_5 = 0.0121$ | | |
| $r_6 = 7.4885$ | | | |
| | $d_6 = 2.9650$ | $n_4 = 1.755$ | $\nu_4 = 52.3$ |
| $r_7 = -6.1582$ | | | |
| | $d_7 = 0.6039$ | $n_5 = 1.74$ | $\nu_5 = 31.7$ |
| $r_8 = 4.3237$ | | | |
| | $d_8 = 3.2609$ | $n_6 = 1.43389$ | $\nu_6 = 95.2$ |
| $r_9 = -5.6027$ | | | |
| | $d_9 = 0.4650$ | | |
| $r_{10} = 8.2802$ | | | |
| | $d_{10} = 0.06039$ | $n_7 = 1.6134$ | $\nu_7 = 43.8$ |
| $r_{11} = 3.4432$ | | | |
| | $d_{11} = 2.5362$ | $n_8 = 1.43389$ | $\nu_8 = 95.2$ |
| $r_{12} = -3.9752$ | | | |
| | $d_{12} = 0.6039$ | $n_9 = 1.6134$ | $\nu_9 = 43.8$ |
| $r_{13} = -204.4505$ | | | |
| | $d_{13} = 0.0242$ | | |
| $r_{14} = 3.2778$ | | | |
| | $d_{14} = 2.2343$ | $n_{10} = 1.43389$ | $\nu_{10} = 95.2$ |
| $r_{15} = -4.9215$ | | | |
| | $d_{15} = 0.6039$ | $n_{11} = 1.6134$ | $\nu_{11} = 43.8$ |
| $r_{16} = 3.5664$ | | | |
| | $d_{16} = 5.0362$ | | |
| $r_{17} = 17.8007$ | | | |
| | $d_{17} = 1.4553$ | $n_{12} = 1.78472$ | $\nu_{12} = 25.7$ |
| $r_{18} = -3.8859$ | | | |
| | $d_{18} = 1.0749$ | $n_{13} = 1.50378$ | $\nu_{13} = 66.8$ |
| $r_{19} = 3.1153$ | | | |

$f = 1.0$, $\beta = 100X$, N.A = 1.4
$\Sigma P = 0.074$, $f_4 = -63.1679$, $f_5 = -37.8255$,
$f_6 = -34.5278$, $f_{456} = -11.9595$ wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{13}$ denote refractive indices of the respective lens elements, the reference symbols $\nu_1$ through $\nu_{13}$ represent Abbe's numbers of the respective lens elements, the reference symbol f designates focal length of the lens system as a whole, the reference symbol $\beta$ denotes magnification of the lens system as a whole, the reference symbol N.A. represents numerical aperture of the lens system as a whole, the reference symbol $\Sigma P$ designates Petzval's sum, the reference symbols $f_4$, $f_5$ and $f_6$ denote focal lengths of the fourth, fifth and sixth lens components respectively, and the reference symbol $f_{456}$ represents total focal length of the fourth, fifth and sixth lens components considered as an assembly.

* * * * *